United States Patent
Nölscher et al.

[11] Patent Number: 6,162,554
[45] Date of Patent: Dec. 19, 2000

[54] METHOD AND SYSTEM FOR UTILIZING ENTHALPY CONTAINED IN EXHAUST GASES OF LOW-TEMPERATURE FUEL CELLS

[75] Inventors: Christoph Nölscher, Nürnberg; Roland Kircher, Aurachtal, both of Germany

[73] Assignee: Siemens Aktiengesellschaft, Munich, Germany

[21] Appl. No.: 09/142,343

[22] PCT Filed: Feb. 11, 1997

[86] PCT No.: PCT/DE97/00249

§ 371 Date: Sep. 4, 1998

§ 102(e) Date: Sep. 4, 1998

[87] PCT Pub. No.: WO97/33330

PCT Pub. Date: Sep. 12, 1997

[30] Foreign Application Priority Data

Mar. 6, 1996 [DE] Germany .............. 196 08 738

[51] Int. Cl.[7] .............. H01M 8/04; H01M 8/10
[52] U.S. Cl. .................. 429/13; 429/26; 429/30
[58] Field of Search .................. 429/13, 26, 30

[56] References Cited

U.S. PATENT DOCUMENTS

| | | | |
|---|---|---|---|
| 3,172,784 | 3/1965 | Blackmer . | |
| 4,490,442 | 12/1984 | Maru et al. | 429/13 |
| 5,200,278 | 4/1993 | Watkins et al. | 429/26 X |
| 5,345,786 | 9/1994 | Yoda et al. . | |
| 5,401,589 | 3/1995 | Palmer et al. | 429/13 |

FOREIGN PATENT DOCUMENTS

| | | |
|---|---|---|
| 0 184 541 A2 | 11/1985 | European Pat. Off. . |
| 0 568 822 A2 | 4/1993 | European Pat. Off. . |
| 40 32 993 C1 | 10/1990 | Germany . |
| 42 34 151 C2 | 12/1992 | Germany . |
| WO 89/10010 | 4/1989 | WIPO . |
| WO 93/10567 | 11/1992 | WIPO . |
| WO 95/06842 | 9/1994 | WIPO . |

OTHER PUBLICATIONS

Patent Abstracts of Japan Application No. JP 58–028177 Feb. 1983.
Patent Abstracts of Japan Application No. JP 5–082150 Apr. 1993.
Patent Abstracts of Japan Application No. JP 4–043567 Feb. 1992.
Patent Abstracts of Japan Application No. JP 7–220745 Aug. 1995.
Patent Abstracts of Japan Application No. JP 4–126369 Apr. 1992.
Article entitled: "The Tokyo electric Power Company (TEPCO) fuel cell evalution program"; Kunio Shibata; *Journal of Power Sources*; vol. 49 (1994) pp. 81–99, (Jan.).
Article entitled: "Status of solid polymer fuel cell system development"; Schoesmith et al; *Journal of Power Sources*; vol. 49 (1994) pp. 129–142. (Apr.).
Article entitled: "Fuel Cells for Extraterrestrial and Terrestrial Applications"; *Journal of the Electrochemical Society*; vol. 1046 (1989). (Feb.).
Article entitled: "Research and Development Project of Fuel Cells in Nedo, Japan"; Yamazaki et al.; *American Institute of Chemical Engineers*; pp. 165–169. (Aug. 1990).

*Primary Examiner*—Stephen Kalafut
*Attorney, Agent, or Firm*—Hill & Simpson

[57] ABSTRACT

A method for utilizing the heat in the exhaust gases of a low-temperature fuel cell module is disclosed, whereby the exhaust gases from the fuel cell are introduced into a condenser for energy acquisition. A system for the implementation of the inventive method is also disclosed.

15 Claims, 2 Drawing Sheets

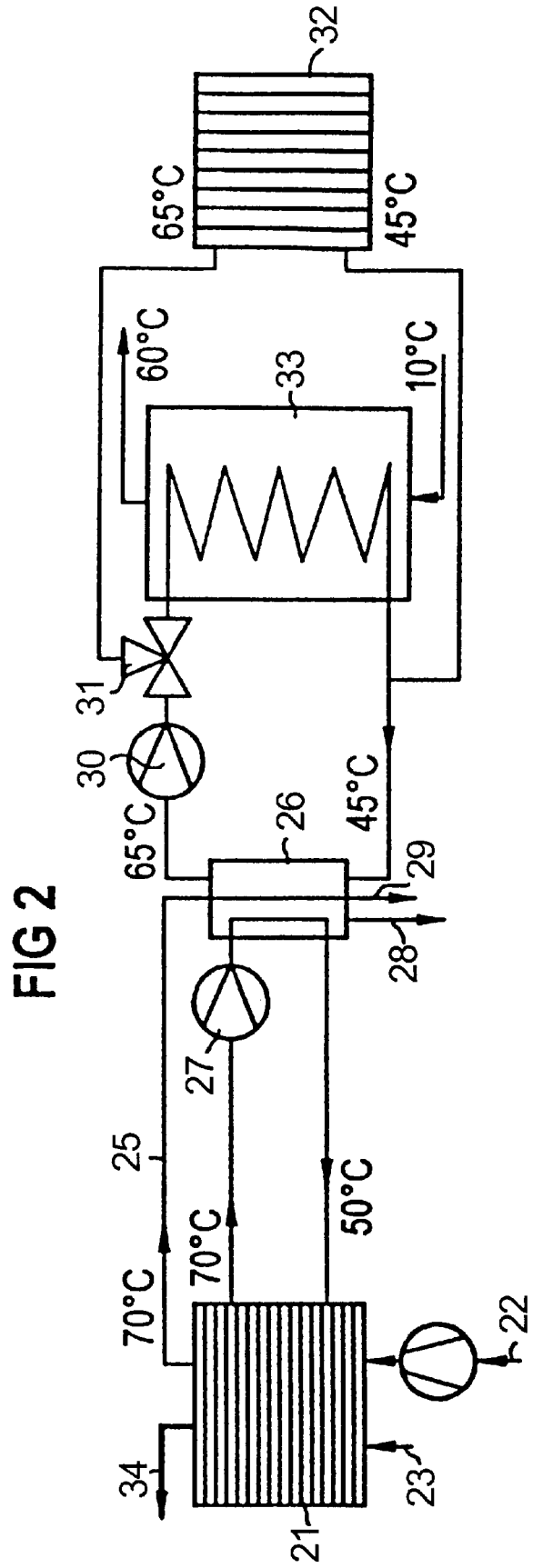

METHOD AND SYSTEM FOR UTILIZING ENTHALPY CONTAINED IN EXHAUST GASES OF LOW-TEMPERATURE FUEL CELLS

FIELD OF THE INVENTION

The invention is directed to a low-temperature fuel cell system with force-heat coupling, as well as to a method for utilizing the waste heat of a low-temperature fuel cell module.

BACKGROUND OF THE INVENTION

German Letters Patent 42 34 151 discloses that the heat from the exhaust gases of high temperature fuel cells exploitable via heat exchangers and via normal flow heaters. German Letters Patent 40 32 993 discloses that the anode exhaust gas of a fuel module, which can, among other things, also be a low-temperature fuel cell module, can be utilized for combustion. It is provided in the embodiment with high-temperature fuel cells contained in this Prior Art that the hot exhaust gases from the high-temperature fuel cells are utilized for pre-heating the as yet unheated fuels that are rich in $H_2$. Up to now, however, no method and no system for the implementation of a method has been disclosed wherein the enthalpy contained in the exhaust gases of low-temperature fuel cells is exploited for increasing the overall efficiency of an energy supply system.

SUMMARY OF THE INVENTION

It is therefore an object of the present invention to offer a method as well as a system for the implementation of a method wherein the enthalpy or condensation energy contained in the exhaust gases of a low-temperature fuel cell module contributes to increasing the overall efficiency of the energy conversion system.

The invention is based on the perception that the condensation energy contained in the exhaust gases of a low temperature fuel cell can be considerable, particularly when it is operated at low pressure, and can be utilized in the overall system of an energy supply system. In particular, there is the underlying perception that the combination of two heat exchangers following a low-temperature fuel cell module—first, a heat exchanger that makes the heat stored in the coolant usable and, second, a heat exchanger that makes the enthalpy contained in the exhaust gases usable—increases the thermal output and, thus, the degree of thermal utilization of the low-temperature fuel cell module such that an overall degree of utilization of the hydrogen fuel of greater than 100% can be achieved with reference to $H_u$ of $H_2$ (net calorific value "$H_u$").

The subject matter of the invention is a method for the utilization of the waste heat of a low-temperature fuel cell module, whereby exhaust gas from the low-temperature fuel cell module that is heated and enriched with vaporous reaction product is introduced such into a heat exchanger that at least the vaporous reaction product contained in the exhaust gas condenses out and the energy being thereby released is rendered usable, as well as a low-temperature fuel cell system with force-heat coupling wherein the exhaust gas is connected to a heat exchanger that comprises a condenser.

The heat exchanger which makes the enthalpy of the exhaust gas usable comprises a condenser. The remaining configuration of the heat exchanger, however, is not intended to limit the scope of the invention in any way whatsoever because other energy converters that convert the enthalpy of the exhaust gas into other usable energy can also be inventively utilized here.

For example, all types of fuel cells whose operating temperature lies below that of the MCFC (molten carbonate fuel cell: operating temperature approximately 600° C.) can be utilized as fuel cells of the low-temperature fuel cell system. Let the PAFC (phosphoric acid fuel cell: operating temperature approximately 150°C.–250°C.), DMFC (direct methanol fuel cell: operating temperature approximately 80° C.–150° C.), PEM (membrane fuel cell: operating temperature approximately 50° C.–80° C.), as well as the AFC (alkaline fuel cell: operating temperature 60° C.–90° C.) be thereby cited by way of example.

The use of the polymer membrane (PEM) fuel cell is especially preferred. What is understood by polymer membrane fuel cell is the PEM fuel cell, whereby PEM stands for polymer electrolyte membrane or proton exchange membrane. The designations SPE (solid polymer electrolyte), SPFC (solid polymer fuel cell), PEFC (polymer electrolyte fuel cell) and IEM (ion exchange membrane) fuel cell are also frequently additionally encountered. These are thereby a matter of fuel cells with macro-molecular membrane electrolytes.

A system is also especially advantageous wherein the energy stored in the used and heated coolant is also rendered usable via a heat exchanger in addition to the utilization of the exhaust gas enthalpy. What is especially advantageous about this is that both the heat exchanger for the coolant as well as the heat exchanger for the exhaust gas can be integrated in a single unit in space-saving fashion. It is especially advantageous given this embodiment when the coolant can be conducted in circulation, i.e. when it is returned to the fuel cell module after cooling and regeneration.

A system with a PEM fuel cell module is also advantageous wherein, in a condenser, the enthalpy from the exhaust gases of the fuel cell module

- is converted into usable energy (for example thermal energy), on the one hand, and
- on the other hand, the condensed product of the fuel cell reaction, i.e. water, is returned into the PEM fuel cell module for moistening.

Given this embodiment, the product water arising in liquid form can thereby be supplied via extra lines into the feeder for the reactants, usually the reaction gases. It then serves for moistening the reaction gases or for moistening the membrane as well. Further, the water obtained from the condenser can also be utilized in some other way (for example water for domestic use).

Given the inventive method, either all of the exhaust gas, i.e. anode and cathode exhaust gas together, can be introduced into the heat exchanger or only one exhaust gas, i.e. either anode or cathode exhaust gas by itself.

The inventive method is preferably operated at an operating temperature of the fuel cell module between 30° C. and 150° C. The temperature ranges between 50° C. and 100° C. are especially preferred and temperature ranges between 45° C. and 80° C. or an operating temperature of approximately 70° C. are particularly preferred.

It is also advantageous when the residual heat of the exhaust gas in the inventive method is further utilized for heating purposes after it has left the condenser. In particular, it is possible to directly supply at least a part of the exhaust gas emerging from the heat exchanger into the ventilation of the building to be heated. However, the exhaust gas emerging from the heat exchanger or condenser can likewise be introduced into a further heat exchanger via lines specifically provided therefor. It can thereby serve for heating fresh water.

"Fuel cell module" is the term for a unit that comprises the actual electrochemical converter, the actuating elements and sensors pertaining thereto and the appertaining humidifier. What is referred to as "fuel cell system" is a system that comprises the module and the appertaining system periphery. The selection of the verb "comprising" is thereby intended to express that the two terms ( . . . module and . . . system) do not limit the units to these features but can also have more and other component parts.

As stated, all low-temperature fuel cells come into consideration as fuel cells in the inventive method and the system therefor. The PEM fuel cell is preferably involved. The reactants converted in the fuel cells are not subject to any limitation whatsoever within the scope of the invention; all gases and liquids that can act as oxidant or fuel in fuel cells are thereby involved. Let air, oxygen and arbitrary mixtures of these components as well as hydrogen, methanol, synthesized and/or reformer gas as well as natural gas be cited by way of example.

The nature of the coolant is in turn based on the nature of the fuel cell employed, whereby deionized water or some other, electrically non-conductive medium, for example ethylene glycol, air or any gas, can be cited by way of example for the preferably utilized PEM fuel cell blocks. A heat-pipe cooling is also possible, whereby the heat exchanger is the condenser for the heat-pipe medium. What is meant by heat-pipe cooling is that the part to be cooled is connected by a three-dimensional channel ( "pipe") to a cooler part, whereby the liquid contained in the pipe evaporates at the part to be cooled and in turn condenses out at the cooler, second part.

What is referred to as "anode exhaust gas" is the exhaust gas that leaves the anode chamber of the fuel cell, i.e. the exhaust gas of the fuel of the fuel cell. Likewise, what is referred to as "cathode exhaust gas" is the exhaust gas that leaves the cathode chamber of the fuel cell, i.e. the exhaust gas of the oxidant.

The method is preferably utilized in stationary energy supply systems; however, an employment in mobile energy supply systems as well is not precluded. The stationary energy supply systems are thereby not only a matter of industrial-scale systems; rather, individual houses or residential complexes can also be equipped with an energy supply system that is operated with the inventive method. The energy supply system comprises a power and heat supply, whereby the heat can be used for the purpose of room heating and/or for preparing warm or hot water. The electrical energy can be used in an E-store, for example battery or flywheel, the thermal energy in a heat store. In general, the inventive principle can be realized in all possible dimensions, whereby the employment in stationary heating systems such as, for example, in residential complexes was in the foreground in the development of the invention. Accordingly, the terms "fuel cell module" and "system" can also not be dimensionally fixed because, of course, they can drastically vary dependent on the field of employment.

The inventive heat exchanger for the exhaust gas, which can also be an energy converter, uses the energy of the exhaust gas that, first, becomes free when the gas is brought to a lower temperature and that, second, is freed as condensation energy in the liquidization of the vapor. The energy of the attracting molecular forces, i.e. the condensation energy, thereby constitutes by far the greater part. This energy is equal to the specific evaporation energy of the liquid. It has an especially high value given water, namely $4.06 \times 10^7$ J/mol or $2.25 \times 10^6$ J/kg. Inventively, this energy is utilized via a unit following upon the fuel cell.

Given the preferably utilized PEM fuel cell module, the product water is formed at the cathode side on which the oxidant flows. Although the vapor-saturated cathode exhaust gas is correspondingly preferably introduced into the heat exchanger, product water can also always be found at the anode side as a consequence of diffusion because of the great differences in concentration of water within each and every fuel cell, and the anode exhaust gas can also be productively introduced into a heat exchanger.

Further, the product water that has arisen in the heat exchanger or condenser cannot only be re-employed and, in particular, utilized for moistening the reactants or the membrane, the enthalpy remaining in the "second exhaust gas" after condensation of the product can also be simultaneously released. Differing from the exhaust gas that exits the fuel cell, the exhaust gas that leaves the heat exchanger, energy converter or condenser and that is colder is referred to here as "second exhaust gas". Nonetheless, this second exhaust gas also still has unexploited energy and enthalpy that can be productively used. In particular, the second exhaust gas can be directly supplied into the room air for heating. In addition, it can also be partially supplied into the room air and partially subjected to a further energy converter or heat exchanger.

"Condenser" is used here in the usual sense as generally standard synonym for a condensation heat exchanger. What is meant by "reformer" is an $H_2$ generator from hydrocarbon compounds (for example natural gas or methanol).

In an embodiment, the method of the present invention comprises a method for utilizing heat generated by a low temperature fuel cell module which produces exhaust gas that includes air and reaction product vapor. The method of the present invention includes the steps of passing the exhaust gas through a heat exchanger, condensing at least part of the reaction product vapor in the heat exchanger as the exhaust gas is passed therethrough thereby generating heat of condensation, passing a fluid medium through the heat exchanger as the reaction product vapor is condensed therein and heating the fluid medium with the heat of condensation generated by the condensing of the reaction product vapor to generated a heated fluid medium.

In an embodiment, the fuel cell module further produces a stream of heated coolant and the method of the present invention further comprises the step of passing the heated coolant through the heat exchanger and transferring heat from the heated coolant to the fluid medium.

In an embodiment, the heated fluid medium is used to provide heat for a building or a home.

In an embodiment, the air component or secondary exhaust gas component of the exhaust gas contains heat as it departs the heat exchanger and, therefore, in such an embodiment, the heat contained in the air component of the exhaust gas or the "secondary exhaust gas" issues for heating purposes. In such an embodiment, heat contained in the secondary exhaust gas can be used to heat a second fluid medium or to directly heat a room or building in the event the secondary exhaust gas is air.

In an embodiment, the present invention provides a polymer membrane fuel cell with force-heat couplings that generates an exhaust gas that includes reaction product vapor. The system further comprises a heat exchanger through which the exhaust gas passes and a condenser for condensing at least some of the reaction product vapor and generating heat of condensation. The heat exchanger transfers the heat of condensation to a fluid medium.

Other objects and advantages of the present invention will become apparent from reading the following detailed description and appended claims, and upon reference to the accompanying drawings.

The above definitions are valid for the claims, the specification and the descriptions of the Figures. The invention shall now be explained below on the basis of an example that shows domestic energy supply with PEM fuel cells upon utilization of the inventive method:

BRIEF DESCRIPTION OF THE DRAWINGS

In the drawings:

FIGS. 1 and 2 illustrate schematically, the system technology of stationary applications of the inventive method.

Figure 1:
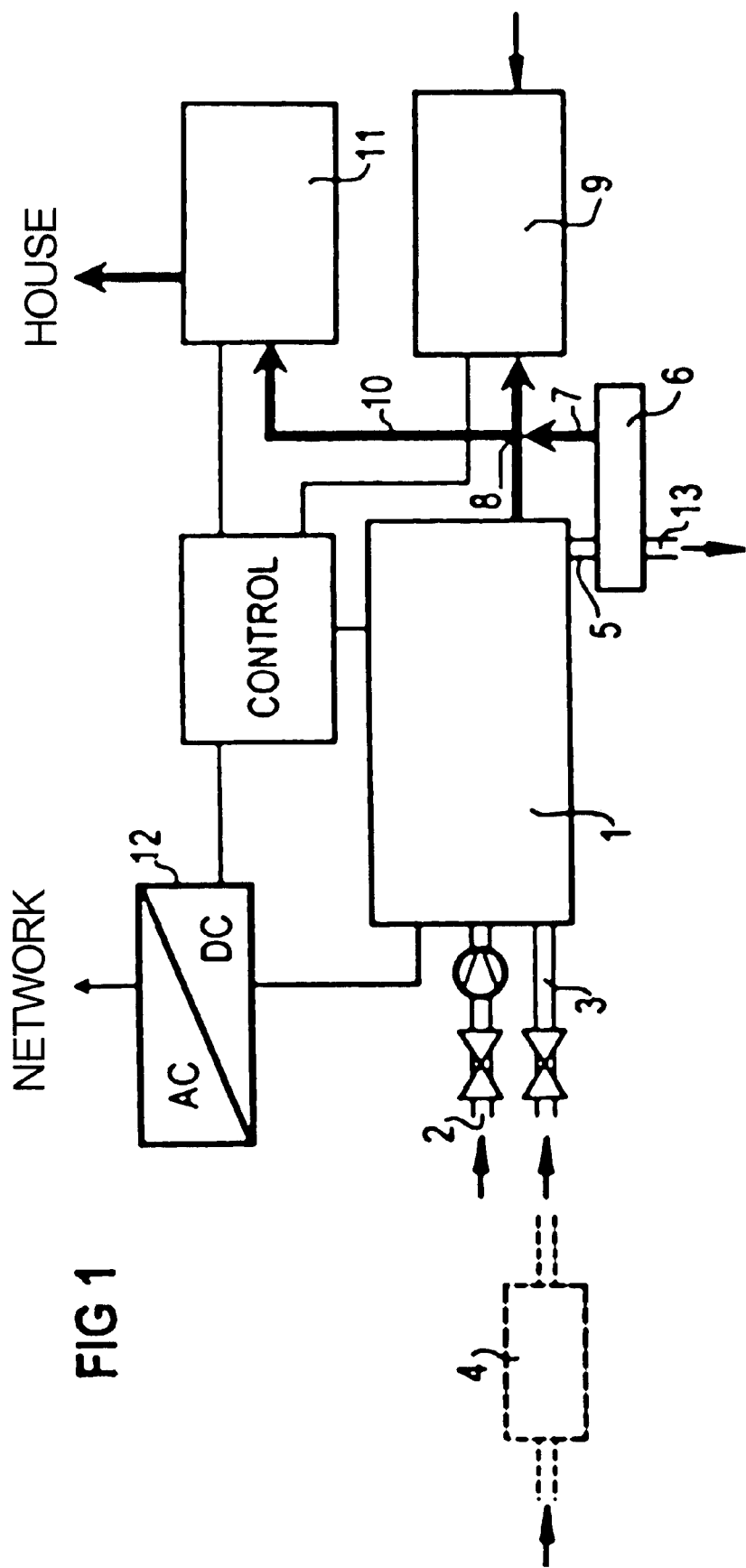

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

The block circuit diagram of the system can be seen in FIG. 1. The fuel cell module 1 with the two feeds 2 and 3 is in the middle of the illustration. The oxidant (air) is supplied to the fuel cell module 1 via the feed 2 and the fuel (H$_2$) comes via the feed 3. In addition to air, the oxidant can thereby also be oxygen or arbitrary mixtures of the two and the fuel can be hydrogen, methanol, synthetic and/or reformer gas as well as natural gas. In the case of reformer gas or methanol, the feed 3 can also be preceded by a reformer 4. The exhaust gas leaves the fuel cell module via the outlet 5 and reaches the condenser 6. The exhaust gas is cooled in the condenser 6 and the product water is condensed out. The conduit 7 conveys the water heated via the condenser, first, to the warm water store 9 via the connection 8 and, second, to the heat exchanger 11 via the conduit 10, said heat exchanger 11 being directly connected to the household. The "second exhaust air" and the condensed product water leave the condenser 6 at the other side of the condenser 6, at the outlet 13. To the left of the fuel cell module 1, the generated electricity is conducted to the current transformer 12 that transforms the direct current generated by the fuel cell module into alternating current. The alternating current can then be supplied, on the one hand, into the household and, on the other hand, into the public network.

FIG. 2 shows a further diagram of the household energy supply with PEM fuel cells upon heat output given hydrogen/air operation. The fuel cell module 21, which is supplied with hydrogen and air via two feeds 22 and 23, is at the far left in the Figure. The cooling circulation, in which the coolant is conducted in circulation between the heat exchanger of the unit 26 and the fuel cell module 21, is located at the right following the fuel cell module. The coolant flows into the fuel cell module with a temperature of, for example, 50° C. and leaves it with a temperature of, for example, 70° C. Via a pump 27, the approximately 70° C. hot outflow proceeds into the unit 26 and into the heat exchanger therein, the latter being connected to a heating circulation and the outflow giving off thermal energy therein while being cooled to approximately 50° C. The coolant is in turn regenerated with this temperature and can be introduced into the fuel cell module.

The exhaust air from the fuel cell module 21 saturated or at least enriched with water vapor proceeds via the conduit 25 to the unit 26 that also has a condenser integrated in addition to the heat exchanger. The water vapor contained in the exhaust air is condensed in the condenser of the unit 26 to water that leaves the unit 26 as useful water via the outlet 28. The condensation heat being released and the heat of the exhaust air as well as the heat of the coolant are used to supply the heat circulation connected to the heat exchanger and condenser unit 26 with thermal energy. The heating agent conducted in circulation in the heating circulation enters, for example, into the unit 26 with a temperature of, for example, 45° C. and leaves the unit with, for example, 65° C. having been heated by approximately 20° C. It then proceeds via a pump 30 to a distributor 31 via which it is partially conducted into the heating element 32 and partly into the warm water store 33. The warm water store is supplied with tap water at 10° C. and can heat the tap water in this system to approximately 60° C. Current, which is again conducted through a d.c./a.c. transformer, is acquired for the electricity supply of the house at the other side of the fuel cell module 21 (line 32).

The inventive system can make both electricity as well as heat for heating purposes and for preparing warm water available. The heating circulation can also be omitted; the heat is then used only for preparing warm water.

The temperatures indicated in FIG. 2 are preferred operating temperatures; the system, however, works up to an operating temperature of the fuel cell module of approximately 30° C. through 40° C. while increasing the thermal efficiency of the overall energy supply system. The water acquired from the heat exchanger and condenser unit 26 can be introduced into a service water system and can also be partly or entirely utilized for moistening the membrane of the fuel cell module. The exhaust air emerging from the unit 26 via the conduit 29 has a residual caloric content that can in turn be used either directly for heating rooms or via a further heat exchanger, the latter particularly when the system uses the heat mainly for preparing warm water. The structural design of the unit 26 can comprise all possible forms of the combination of heat exchanger and condenser, whereby the efficiency of the overall system becomes all the higher the lower the energy content of the exhaust air emerging from the unit 6.

What is claimed is:

1. A method for utilizing heat generated by a fuel cell module which produces exhaust gas comprising air and reaction product vapor and a stream of heated coolant, the method comprising the steps of:

passing the exhaust gas through a condensing section of a heat exchanger;

condensing at least part of the reaction product vapor in the condensing section of the heat exchanger as the exhaust gas passes therethrough thereby generating heat of condensation;

passing a fluid medium through a heat exchange section of the heat exchanger as the reaction product vapor is condensed therein;

heating the fluid medium with the heat of condensation generated by the condensing of the reaction product vapor to generate a heated fluid medium;

passing the heated coolant through the heat exchange section of the heat exchanger; and transferring heat from the heated coolant to the fluid medium.

2. The method of claim 1 wherein the condensing section of the heat exchanger and the heat exchange section of the heat exchanger are contained within a common housing.

3. The method of claim 1 wherein the heated fluid medium is used to provide a heat supply for a building.

4. The method of claim 1 wherein the fuel cell is a polymer membrane fuel cell.

5. A method for utilizing heat generated by a low-temperature fuel cell module which produces exhaust gas comprising reaction product vapor and secondary exhaust gas and a stream of heated coolant, the method comprising the steps of:

passing the exhaust gas through a condensing section of a heat exchanger;

condensing at least part of the reaction product vapor in the condensing section of the heat exchanger as the exhaust gas passes therethrough thereby generating heat of condensation;

passing a first fluid medium through a heat exchange section of the heat exchanger as the reaction product vapor is condensed therein;

heating the first fluid medium with the heat of condensation generated by the condensing of the reaction product vapor;

removing the condensed reaction product from the condensing section of the heat exchanger;

removing the secondary exhaust gas from the condensing section of the heat exchanger;

heating a second fluid medium with the secondary exhaust gas, and passing the heated coolant through the heat exchange section of the heat exchanger; and transferring heat from the heated coolant to the first fluid medium.

6. The method of claim 5 wherein the condensing section of the heat exchanger and the heat exchange section of the heat exchanger are contained within a common housing.

7. The method of claim 5 wherein the first fluid medium is used to provide a heat supply for a building after it passes though the heat exchanger.

8. The method of claim 5 wherein the second fluid medium is room air.

9. The method of claim 5 wherein the step of heating the second fluid medium with the secondary exhaust gas comprises:

passing the secondary exhaust gas and the second fluid medium through a second heat exchanger.

10. The method of claim 5 wherein the second fluid medium is air and the step of heating the second fluid medium with the secondary exhaust gas comprises:

transferring the secondary exhaust gas to a room containing the second fluid medium.

11. The method of claim 5 wherein the low-temperature fuel cell comprises a polymer membrane fuel cell.

12. A polymer membrane fuel cell system with force-heat coupling, the system comprising:

a polymer membrane fuel cell that generates an exhaust gas comprising reaction product vapor, the system further comprising a heat exchanger through which the exhaust gas passes, the heat exchanger comprising a condenser for condensing at least some of the reaction product vapor and generating heat of condensation, the heat exchanger transferring the heat of condensation to a fluid medium and wherein coolant is passed through the polymer membrane fuel cell where the coolant is heated, and the coolant is further passed through the heat exchanger where heat from the coolant is transferred to the fluid medium.

13. The polymer membrane fuel cell system of claim 12 wherein the condenser is connected to the fuel cell and the condensed reaction product is transmitted from the condenser to the fuel cell.

14. A low-temperature fuel cell system with force-heat coupling, the system comprising:

a fuel cell that generates an exhaust gas comprising reaction product vapor and a secondary exhaust gas and a stream of heated coolant, the system further comprising a heat exchanger through which the exhaust gas passes, the heat exchanger comprising a condenser for condensing at least some of the reaction product vapor and generating heat of condensation, the heat exchanger transferring the heat of condensation to a fluid medium and heat from the stream of heated coolant to the fluid medium, the condenser further being connected to a building by a conduit for transferring the secondary exhaust gas to the building.

15. The fuel system of claim 14 wherein the secondary exhaust gas is air.

* * * * *